United States Patent
Edmonds et al.

(10) Patent No.: US 7,958,127 B2
(45) Date of Patent: Jun. 7, 2011

(54) TAG-MEDIATED REVIEW SYSTEM FOR ELECTRONIC CONTENT

(75) Inventors: Andy Edmonds, Norcross, GA (US); Brad Fallon, Norcross, GA (US)

(73) Assignee: UQast, LLC, Douglasville, GA (US)

(*) Notice: Subject to any disclaimer, the term of this patent is extended or adjusted under 35 U.S.C. 154(b) by 330 days.

(21) Appl. No.: 12/032,473

(22) Filed: Feb. 15, 2008

(65) Prior Publication Data

US 2008/0201348 A1    Aug. 21, 2008

Related U.S. Application Data

(60) Provisional application No. 60/890,054, filed on Feb. 15, 2007.

(51) Int. Cl.
*G06F 17/00* (2006.01)
(52) U.S. Cl. ........................................ 707/748
(58) Field of Classification Search .................. None
See application file for complete search history.

(56) References Cited

U.S. PATENT DOCUMENTS

| | | | | |
|---|---|---|---|---|
| 6,466,918 | B1* | 10/2002 | Spiegel et al. | 705/10 |
| 6,711,581 | B2* | 3/2004 | Rebane | 1/1 |
| 6,873,982 | B1* | 3/2005 | Bates et al. | 1/1 |
| 7,620,651 | B2* | 11/2009 | Chea et al. | 1/1 |
| 2006/0271524 | A1* | 11/2006 | Tanne et al. | 707/3 |
| 2007/0239713 | A1* | 10/2007 | Leblang et al. | 707/6 |
| 2007/0266025 | A1* | 11/2007 | Wagner et al. | 707/7 |

\* cited by examiner

*Primary Examiner* — Hung Q Pham
(74) *Attorney, Agent, or Firm* — Michael J. Mehrman; Mehrman Law Office P.C.

(57) ABSTRACT

A tag-mediated review system for electronic content that ranks content based upon several ascertainable factors, including the implicit engagement with the content by users (typically online viewers); the expertise and success in the topical domain by reviewers; and the review activity of users or viewers. The system extends implicit metrics to tracking of user interaction including the receipt of video and audio content over the web. Document ranking is mediated by tags that identify the subject matter addressed by an associated document as the ranking mediators for computing content quality scores values for user and reviewer activity. The tag-mediated content quality scores, which are content quality scores for the subject matter area identified by the associated tags, can be exposed to end-users and used directly or indirectly to complement search engine retrieval algorithms.

20 Claims, 10 Drawing Sheets

TAG-MEDIATED REVIEW SYSTEM FOR ELECTRONIC CONTENT

REFERENCED TO RELATED APPLICATIONS

This application claims priority to commonly-owned U.S. Provisional Patent Application Ser. No. 60/890,054 filed on Feb. 15, 2007, which is incorporated herein by reference.

TECHNICAL FIELD

This invention relates to network-based content retrieval, distribution and sale systems and, more specifically, relates to a tag-mediated system for tracking, ranking and compensating authors, reviewers and distributors of on-line content.

BACKGROUND OF THE INVENTION

The Internet has developed into an extremely rich source of information and electronic commerce. In fact, the Internet has produced the situation referred to as information overload, where there is so much information available that the ability to find the best or most relevant information has become of paramount importance. Much effort has therefore been devoted to search engine technology that analyzes and ranks search results to provide search results with the most relevant information at the top of the list. Product or content reviews are another mechanism used to rank and qualify documents and other materials. Techniques for review and ranking electronic content have become quite sophisticated, taking into account factors such as the number of reviews, the subject matter areas of a particular reviewing party, the area of expertise of the reviewing party, the rank or perceived credibility of the reviewing party in the relevant area, and so forth. As potential customers and search engines increasingly rely on sophisticated electronic content ranking and review systems, the need for effective ranking systems for electronic content continues to develop.

The Internet has also developed into an extremely platform for conducting electronic commerce. All types of products and services can be advertised and in may cases sold or performed electronically. The ability to assess the quality of a product or service prior to purchase online can be challenging, as the product or service must often be purchased sight unseen. This is often the case even for electronic content, such as books, music and educational materials sold online Online shippers can find it difficult to locate quality assessment information that they feel comfortable relying upon. The lack of credible quality assessment information can depress the dissemination of information regarding high quality, beneficial products and services while providing predatory opportunities for unscrupulous vendors. In generally, improved dissemination of credible quality assessment information improves the efficiency of the electronic commerce marketplace, improves customer satisfaction, and promotes vendors of high quality goods and services. There is, therefore, a continuing need for the provision of credible quality assessment information in the electronic commerce marketplace.

Therefore, a continuing need exists for more effective methods and systems for providing credible quality assessment information in the electronic commerce marketplace.

SUMMARY OF THE INVENTION

The present invention meets the needs described above in a tag-mediated review system ("TMRS") for electronic content. In a worldwide electronic commerce community full of non-professional user and professionally generated content, attention is the scarcest resource. The TMRS provides an improved ranking system for electronic content that ranks the content based upon several ascertainable factors, including (a) the implicit engagement with the content by users (typically online viewers); (b) the expertise and success in the topical domain by reviewers; and (c) and the review activity of users or viewers. While implicit feedback and explicit document ranking systems have been developed previously, the TMRS extends implicit metrics to tracking of user interaction including the receipt of video and audio content over the web. The TMRS also creates a unique paradigm of using "tags" that identify the subject matter addressed by an associated document as the ranking mediators for computing content quality scores values for user and reviewer activity. Tags allow the universe of electronic information to be divided by subject matter so that individual pieces of content and human participants, such as end-users or viewers of content, reviewers of content, evaluators of reviewers referred to as moderators, reviewers of moderator reports, and so forth can all be tracked and ranked with respect to different subject matter categories within the tag-based system. The tag-mediated content quality scores, which are content quality scores for the subject matter area identified by the associated tags, can be exposed to end-users. The tag-mediated content quality scores and/or a composite content quality score can also be used to complement search engine retrieval algorithms based on traditional keyword-based information retrieval.

To get the TMRS initialized, an initial set of predefined tags can be created by system developers and used to rank an initial infrastructure of electronic content. But once the system has been released for public assess, the TMRS will develop over time into a continually developing, dynamic set of user-generated source document and associated keywords expressed as tags that users have developed and attached to their content as metadata expressing the utility of the content in various subject matter areas. In this manner, tags can be created by content producers, associated with content items by the content producers, and exposed to content consumers as part of a navigation interface, such as a search engine or other information retrieval system. Tags stored as metadata have already become quite popular on the Internet today, largely due to the ease with which metadata can be created and the relevance assigned to metadata by certain search engine algorithms. As website developers will appreciate, good metadata increases search engine visibility. The current metadata system is characterized by a lack of strongly enforcement of a taxonomy, which makes tag categorization a dynamic environment while making for an easier user experience. In other words, the system imposes very few technical limits on the terms that can be stored as metadata tags in a website, but the tags are only effective in increasing the website's search engine visibility to the extent that search engine users enter those particular tags when using the search engine. Accordingly, the present invention does not seek to develop or impose a predefined set of tags, but instead implements a system in which tags automatically become ranked as they are developed and used within the TMRS. The TMRS is therefore configured to inherently develop its own dynamic taxonomy through community interaction over time.

Generally described, the invention may be implemented as a method, a computer-controlled apparatus, or a computer-readable medium storing computer-executable instructions for causing a computer-controlled apparatus to implement a TMRS for electronic content. The TMRS provisions an initial content quality information database based on tag-mediated content quality information obtained from a number of sources, such as reviews concerning source documents and moderator reports concerning reviews. Content quality scores are computed based on implicit engagement metrics and explicit sales metrics obtained by monitoring on-line user interaction with the source content, the reviews and the moderator reports. The content quality scores stored in the database are then used by the TMRS when responding to document retrieval requests, which may include known document requests and search engine requests. For a known document request, the TMRS typically displays the tags and associated tag scores for the requested document when returning an indicator identifying the requested document. For a document search submitted to a search engine, the TMRS uses the content quality scores to rank the search results to obtain initial search results, and may also re-rank the search results based on an analysis of tags associated with the search request and corresponding tag scores maintained in the content quality information database. The TMRS continually updates the tag-mediated scores maintained in the content quality information database based on new source content, reviews, moderator reports and user interaction with these resources.

To provision the content quality information database, the TMRS obtains on-line access to an infrastructure of electronic content including a large supply of electronic source documents, wherein each electronic source document includes source content supplied by an associated content producer and a number of tags identifying subject matter addressed by the source content, which are typically stores as metadata in the same electronic file as the source content. The TMRS also receives a large number of reviews concerning the source documents in which each review expresses quality assessment information concerning a source document. Each review has been submitted by an associated reviewer, for which the TMRS also tracks tag-mediated statistics. Each review also includes one or more tags identifying subject matter addressed by the review, which are typically inherited from the source document that is the subject of the review. The TMRS computes a tag-mediated content quality score for each source document based at least in part on the reviews, in which each tag-mediated content quality score includes tag scores for one or more tags in the associated source document. The TMRS then compiles the content quality information database storing the tag-mediated content quality scores in association with the associated tags and identifiers of the associated source documents. As noted above, this is an ongoing process as source documents, reviews and content quality scores are continually updated with new documents and user monitoring data added to the system over time.

Once the content quality information database has been provisioned, the TMRS receives a document retrieval request. The system responds to the request by retrieving information pertaining to one or more source documents responsive to the document retrieval request, and also by retrieving the tag-mediated content quality scores associated with the responsive source documents. The TMRS then displays information identifying the responsive source documents and the associated tag-mediated content quality scores. Alternatively, the TMRS may rank the responsive source documents in a priority order based directly or indirectly on the tag-mediated content quality scores and display indicators for the responsive documents in the priority order.

More specifically, for a known document request, the TMRS identifies a particular responsive source document and displays an identifier of the particular responsive source document in association with a plurality of the tags associated with the particular responsive document and the corresponding tag scores for the particular responsive source document.

For a document search request submitted to a search engine, the TMRS ranks the responsive source documents in a priority order based directly or indirectly on the tag-mediated content quality scores and display indicators for the responsive documents in the priority order. In addition, the TMRS may retrieve initial search results from the search engine ranked at least in part based on the content quality scores in the content quality information database and then compare terms in the document search request to tags stored in the content quality information database. Based on this comparison, the TMRS identifies one or more relevant tags associated with the search request and re-ranks the search results based on highest relative tag scores for the tags associated with the search request in a re-ranked priority order. Identifiers of the source documents among the search results are then displayed in the re-ranked priority order. The TMRS may also display as part of the search results an identifier of a particular source document, one or more tags associated with the search request, and the tag scores for the particular source document corresponding to the tags associated with the search request.

In connection with building the content quality information database, the TMRS typically receives a number of reviews concerning a number of source documents associated with a particular content producer. The TMRS then computes a tag-mediated content producer rank for the particular content producer based on the reviews concerning the source documents associated with the particular content producer. The content producer rank, which typically includes tag scores for one or more tags in the source documents, is then stored in the content quality information database in association with the an identifier of the associated content producer. This allows the computation of the tag-mediated content quality score for each source document associated with the particular content producer to be based at least in part on the content producer rank for the particular content producer.

The TMRS computes the tag-mediated content producer rank for the particular content producer further by obtaining implicit engagement metrics indicative of user interaction with the source documents associated with the all content producers represented in the content quality information database. The TMRS also obtains implicit engagement metrics indicative of user interaction with source documents associated with the particular content producer, and normalizes the content producer rank for the particular content producer based on the implicit engagement metrics for the particular content producer and the implicit engagement metrics for all content producers represented in the content quality information database.

The TMRS may also compute the content producer rank for the particular content producer by obtaining explicit sales metrics indicative of sales activity resulting from user interaction with the source documents associated with the all content producers represented in the content quality information database. The TMRS also obtains explicit sales metrics indicative of sales activity resulting from user interaction with the source documents associated with the particular content producer, and normalizes the content producer rank for the particular content producer based on the explicit sales metrics for the particular content producer and the implicit engagement metrics for all content producers represented in the content quality information database. The TMRS may also use both implicit engagement metrics and explicit sales metrics to compute and normalize the content producer rank.

As another aspect of the system, the TMRS may receive a number of moderator reports concerning the reviews, in which each moderator report expresses quality assessment information for a review by an associated moderator. The moderator report also includes one or more tags identifying subject matter addressed by the moderator report. The tags included in the moderator report are typically inherited from the review considered by the moderator, which, in turn, are inherited from the source documents considered in the review. The TMRS computes a tag-mediated reviewer rank for each reviewer based on the moderator reports. Each tag-mediated reviewer rank typically includes tag scores for one or more tags in the associated reviews. The reviewer ranks are then stored in the content quality information database in association with the associated tags and identifiers of the associated reviewers. This allows the computation of the tag-mediated content quality score for each source document to be based at least in part on the content producer rank for the particular content producer reviewer ranks of one or more reviewers who have submitted reviews concerning the source document.

Like the content producer rank, the reviewer rank for a particular reviewer is computed by obtaining implicit engagement metrics indicative of user interaction with the reviews submitted by all reviewers represented in the content quality information database. The TMRS also obtains implicit engagement metrics indicative of user interaction with the reviews submitted by the particular reviewer, and normalizes the reviewer rank for the particular reviewer based on the implicit engagement metrics for the particular reviewer and the implicit engagement metrics for all reviewers represented in the content quality information database.

The document scoring algorithm can be further extended to moderators by receiving a number of moderator reviews concerning the moderator reports, in which each moderator review expresses quality assessment information for a moderator report and one or more tags identifying subject matter addressed by the moderator review. Again the tags associated with the moderator reviews are typically inherited from the underlying source documents through the chain of reviews leading to the moderator review. The TMRS computes a tag-mediated moderator rank for each moderator based on the moderator reviews, in which each tag-mediated moderator rank typically includes tag scores for one or more tags in the associated moderator reports. The TMRS storing the tag-mediated moderator ranks in the content quality information database in association with the associated tags and identifiers of the associated moderators. This allows the content quality score for each source document to be based at least in part on the moderator ranks of one or more moderators who have submitted moderator reports concerning one or more reviews concerning the source document.

Similar to the procedure used to rank reviewers, the tag-mediated moderator rank for a particular moderator is computed by obtaining implicit engagement metrics indicative of user interaction with the moderator reports submitted by all moderators represented in the content quality information database. The TMRS also obtains implicit engagement metrics indicative of user interaction with the moderator reports submitted by the particular moderator, and normalizes the moderator rank for the particular moderator based on the implicit engagement metrics for the particular moderator and the implicit engagement metrics for all moderator represented in the content quality information database.

The TMRS can also monitor implicit engagement metrics indicative of user interaction with the source documents and computing a user rank for each source document based at least in part on the implicit metrics indicative of user interaction with the source document. This allows the computation of the a tag-mediated content quality score for each source document is based at least in part on the user rank for the source document.

Preferably, the TMRS computes the content quality scores based on user ranks, content producer ranks, reviewer ranks and moderator ranks, and may also take other factors into account, such as credentials, affiliation, industry recognition and the like for individual source documents, content providers, reviewers and moderated as desired. The TMRS may also compute a composite content quality score for each source document based on the tag-mediated scores and, if desired, other factors. The composite content quality score provides a single value that can be taken into account when indexing initial search engine results. Once a manageable population of responsive documents has been identified based on the composite content quality score and other factors taken into consideration by the search engine, that smaller set of search results can be re-ranked based on tag-mediated content quality scores matched up to tags identified from the search request text.

As particular examples, the implicit engagement metrics indicative of user interaction for a particular source document can include traffic metrics indicative of hypertext links indicating online user visits to the particular source document, page view metrics indicative of the number pages viewed during the user visits to the particular source document, audio/video metrics indicative of the amount of audio/video content received by users during the user visits to the particular source document, and external embedding metrics indicative of the amount of content from the source document that users embedded into external electronic sites. The explicit sales metrics can include purchases made by users after receiving information from the particular source document, repeat purchases made by users after having made an initial purchase after receiving information from the particular source document, links made by users to sites providing additional information regarding produces or services for sale after receiving information from the particular source document and links made by users to affiliate commercial sites after receiving information from the particular source document. Additional implicit engagement metrics, explicit sales metrics, and other useful metrics can be added to the system as desired. In addition, certain metrics can be weighted more heavily in the document scoring process to meet a particular search result objectives.

In view of the foregoing, it will be appreciated that the present invention provides for a unique, dynamic and advantageous tag-mediated document review system for an on-line community. The specific techniques and structures employed by the invention to implement the system described above will become apparent from the following detailed description of the embodiments of the invention and the appended drawings and claims.

DETAILED DESCRIPTION OF THE EMBODIMENTS

Figure 1:
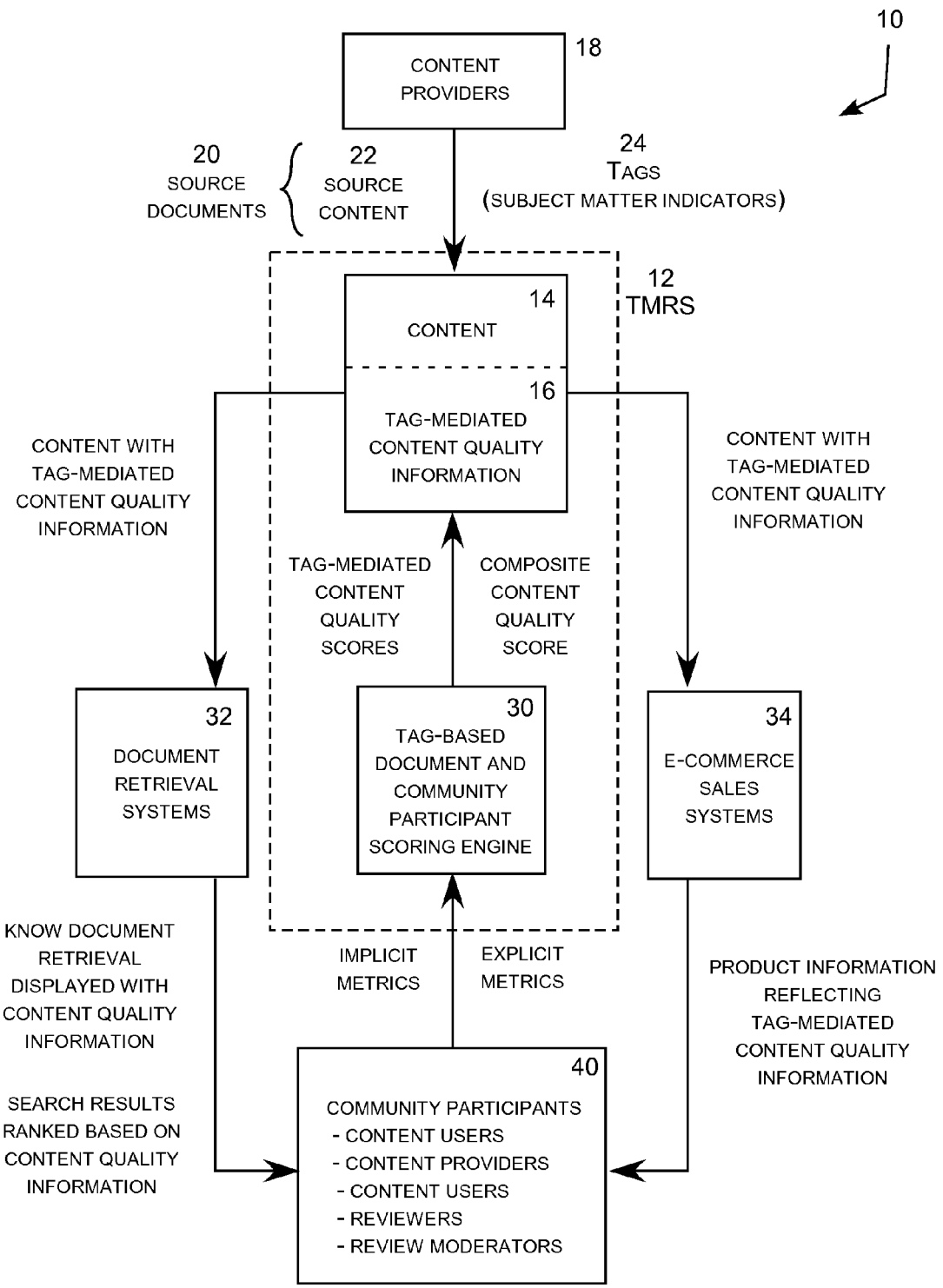
FIG. 1 is a functional block diagram illustrating a tag-mediated review system for electronic content.

The present invention may be embodied in a tag-mediated review system ("TMRS") for electronic content that integrates implicit engagement metrics, explicit sales metrics, reviews of source content, and moderator reports concerning reviews (i.e., reviews of reviews) with user generated tags to produce content quality metrics. Combining tags with reviews of source content, moderator reports, implicit engagement metrics, and explicit sales metrics n the computation of tag-mediated content quality scores the TMRS to be dynamic, resist gaming, and recognize expertise. Reviewers and moderators are rewarded for predicting user behavior by increasing their expertise in the subject matter areas identified by the tags associated with the content represented in the source documents.

Tag mediation refers to the process of qualifying (also referred to as scoring or ranking) source content, content provider, reviewer and moderator expertise in a variety of subject matter areas identified by the tags. Each tags connotes a subject matter area, which allows the system to score each participant and each piece of content in a variety of different subject matter areas and rank them in a priority order with respect to each tag domain separately. Individual pieces of electronic content are associated with tags by the associated content producers, who are expected in general to be the authors of the source documents. Each tag carries a value for each source document, content producer, reviewer and moderator who has submitted content associated with the tag into the system. This allows the tag values to combined and analyzed mathematically. The TMRS implements a variety of scoring algorithms and feedback loops that are mediated by the tag intersection of the content and a user expertise model. In the user expertise model, each participant (i.e., user, content provider, reviewer and moderator) can have one or more expert rank values, in which each expert rank value is associated with a particular tag in the system. The user rankings in various tags can increase or decrease as the associated participant engages with content, receives reviews on their content, reviews the content of other, attracts other users to engage with their content, generates sales through their content, generates content that becomes embedded into third-party websites, produces sales through their content, and generally produces and sells quality content as recognized by other participants in the system through their implicit and explicit engagement with the content.

The resulting model of expertise reflected in the TMRS provides a community of influence where everyone's voice is heard, while expertise is recognized. In addition, the system provides a way to establish a probability that a content producer will provide value through new content prior to receiving the new content. Inappropriate tagging, or invalid claims of expertise, are more rapidly suppressed due to negative attention and increased influence exerted by others reacting to the inappropriate or invalid claims in the respective tag domain.

It will therefore be appreciated that TMRS provides an implicit usage-based feedback system in which user expertise is considered in the content scoring process. This results in a value based ranking system for a body of content, which can be used to create a prior probability query independent ranking system that can be combined with query dependent rankings to produce optimal ranking for search engine information retrieval systems. Accordingly, the TMRS implements a reputation-based electronic content review system in which reviewer expertise is considered. The system also allows for inheritance of authorial value across new content while creating an incentive mechanism for quality tag authoring. The system further provides a mechanism for auditing reviewer quality with implicit metrics and encourages video provider behavior offering both free and paid content.

The TMRS also provides an electronic system for storing informational content and descriptions of information content for commercial sales that supports a community of topic focused users who gain authority in topic areas by demonstrating an ability to affect the priority with which content is shown to other users. The system can be used to provide electronic commerce support for a wide range of informational products, balancing the needs of the user and the content producer. Additionally, affiliates may promote content in order to earn a commission on specific product sales, sales during the user visit, or even sales over a new user's lifetime. In addition to these features, an aggregator of content may combine or provide access to content consumed from other points around the internet through an embedded player in a web page or other application.

In a particular embodiment of the TMRS, reviewers rate content while moderators rate the reviews of that content. Engagement metrics with content are produced by examining the user's opportunities to view the content and whether they do so (e.g. given the user viewed a search result page containing the content item, was it clicked on), the degree to which they engage with the content (e.g. % of video streamed), and whether follow on actions are conducted (e.g. viewing the authors homepage). Engagement metrics are used to audit reviewers and alter the internal quality scores for the reviewer. In addition, videos may be consumed either on the aggregator's site or by an embedded player on the web. Even in the embedding scenario, user's are cookied and their user engagement tracked (e.g. the player reports on both page views and level of content views).

Figure 2:
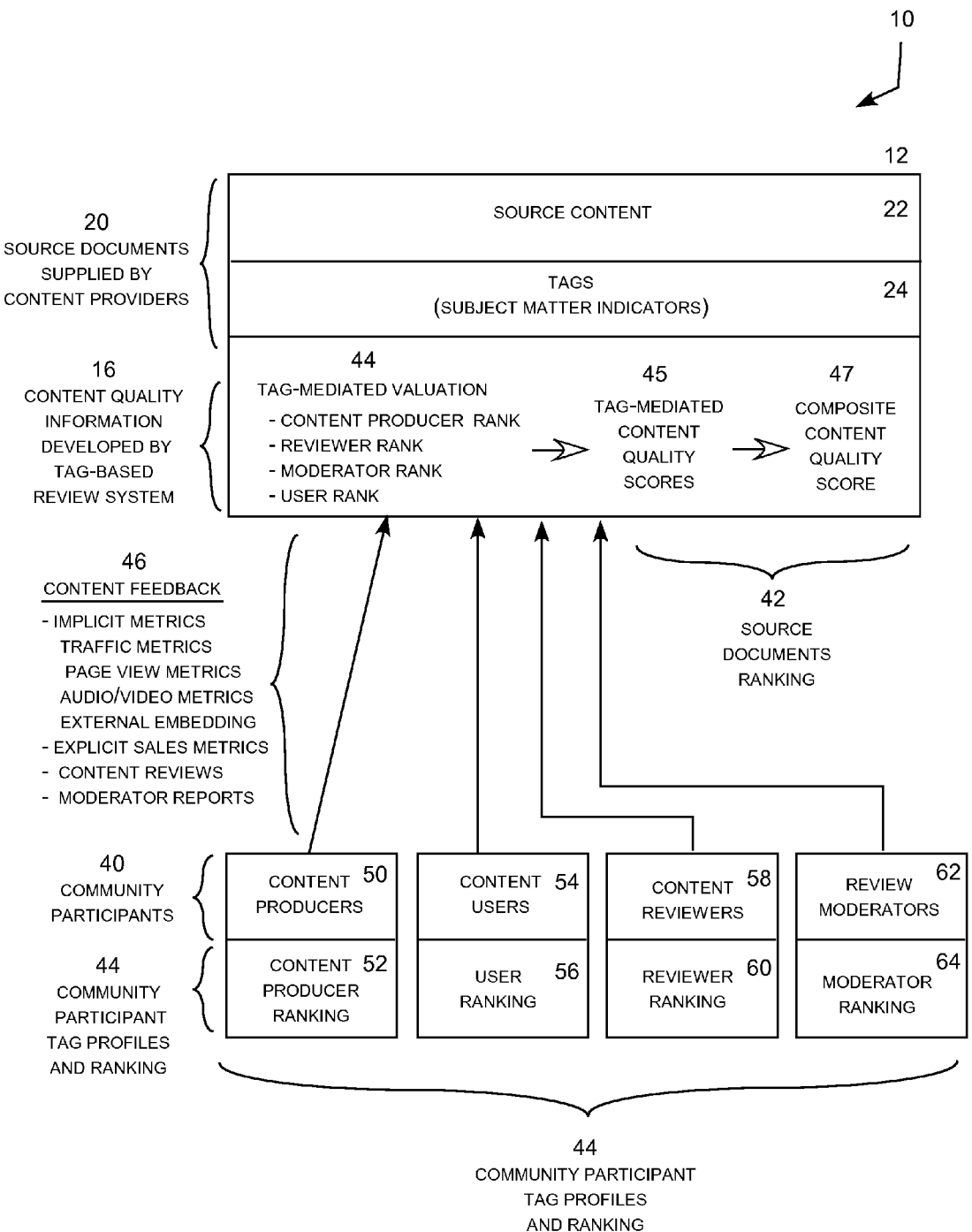
FIG. 2 is a functional block diagram illustrating participants in an electronic community using the tag-mediated review system.
Figure 3:
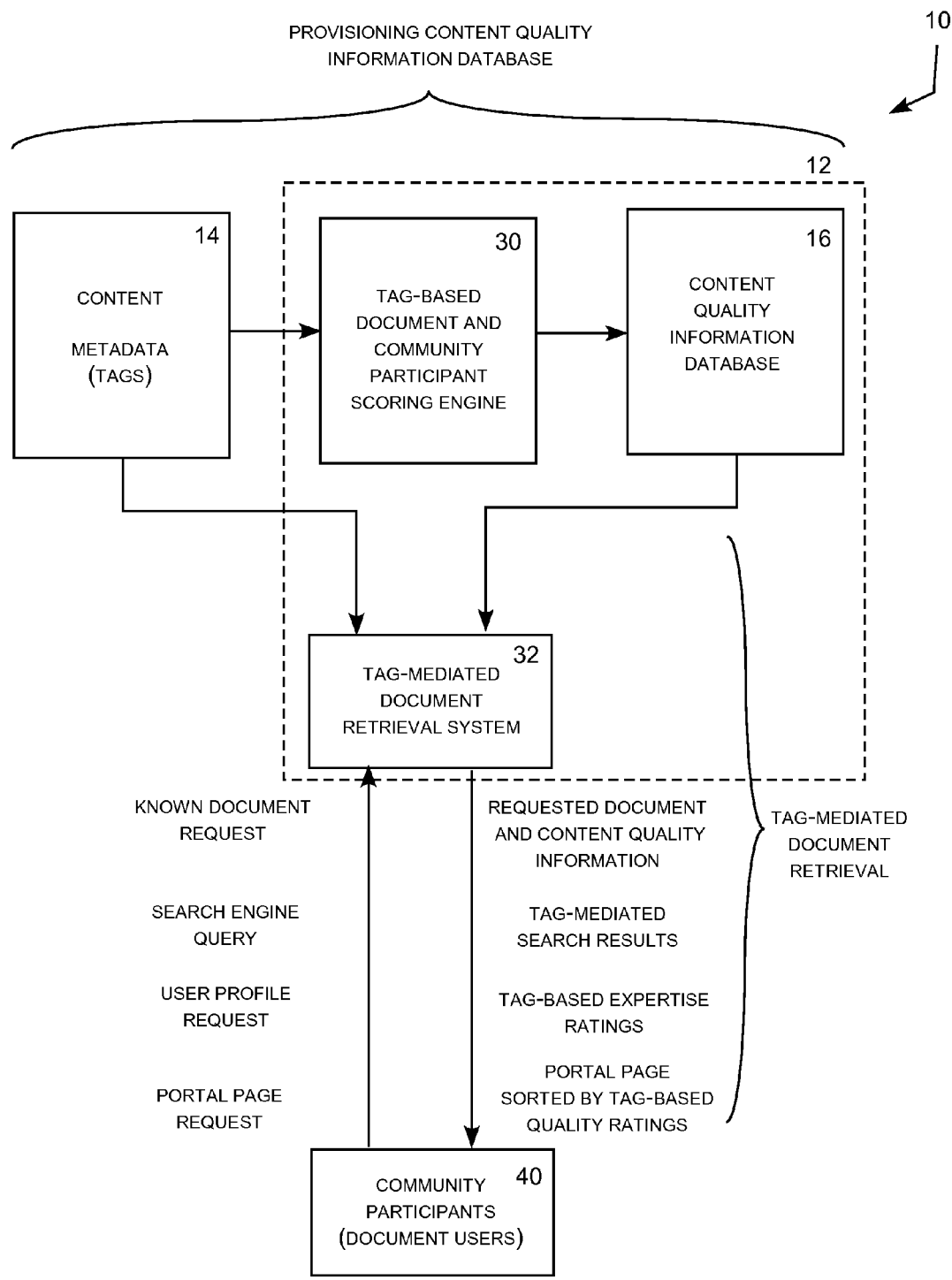
FIG. 3 is a functional block diagram illustrating tag-mediated document retrieval by the tag-mediated review system.
Figure 4:
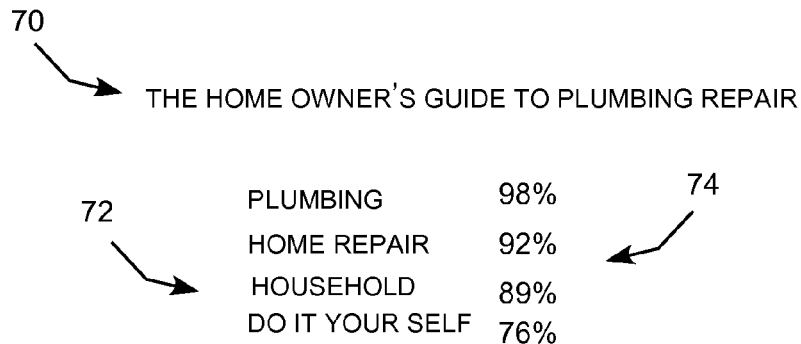
FIG. 4 is a conceptual illustration showing tag-based documents scores computed by the tag-mediated review system displayed in connection with known document retrieval.
Figure 5:
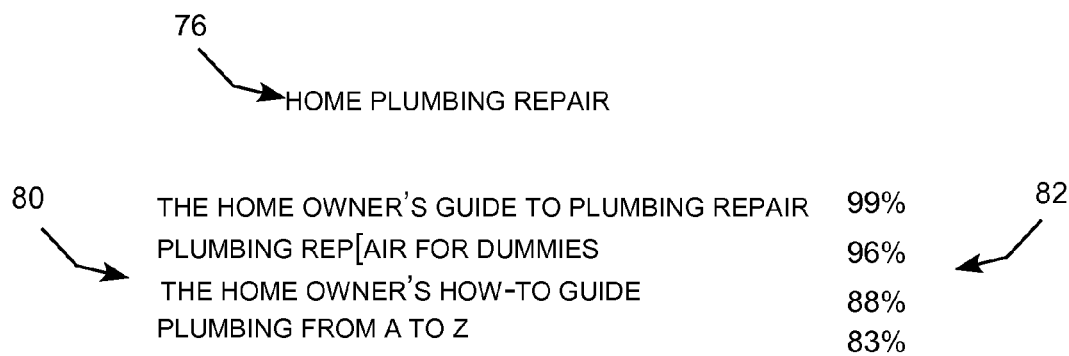
FIG. 5 is a conceptual illustration showing search engine results that are ranked and displayed in a priority using the content quality information stored in the tag-mediated review system.
Figure 6:
FIG. 6 is a conceptual illustration showing identifiers for subject matter experts that are ranked and displayed in a priority using the content quality information stored in the tag-mediated review system

Turning now to the figures, in which like numerals refer to similar elements throughout the figures, FIG. 1 is a functional block diagram illustrating an electronic community 10 using a TMRS 12 for electronic content. FIG. 3 is a functional block diagram illustrating tag-mediated document retrieval by the TMRS. FIG. 4 is a conceptual illustration showing tag-based documents scores computed by the TMRS displayed in connection with known document retrieval. FIG. 5 is a conceptual illustration showing search engine results that are ranked and displayed in a priority using the content quality information stored in the TMRS. FIG. 5 is a conceptual illustration showing subject matter experts that are ranked and displayed in a priority using the content quality information stored in the tag-mediated review system. FIGS. 1-3 are complimentary functional block diagrams illustrating use of the TRMS emphasizing different aspects of the system, and FIGS. 4-6 illustrative three ways, out of a great number of ways, that the TMRS can be used to support and enhance the experience of participants in the electronic community. These figures are therefore referred to concurrently in the following description.

The TMRS 12 includes a large corpus of network accessible electronic content 14 (e.g., the Internet), which will also be referred to as an infrastructure of source documents, and a corpus of tag-mediated content quality information 16. The content 14 is submitted by or in some other way obtained from content providers 18 in the form of a large number of separately identifiable source documents 20. The term "source document" is used in a broad sense to include any type of electronic content that can be accessed in a networked environment, including but not limited to all varieties of information stored on or accessed through websites, as well as other network accessible text, graphics, audio, video, databases, data stored in files, streaming data, and so forth. In general, the source documents 20 include source content 22 that is exposed to users in the ordinary course of accessing the source document and a group of tags 24 that are typically stored as metadata within the same file or file structure as the source content. The tags 24 are typically metadata terms added to the source documents by the content providers identifying the subject mater addressed by the source content understanding that the metadata is ordinarily used by search engines for document identification and retrieval. Content providers therefore have a motivation to provide accurate and robust tags in their source documents to increase the search engine visibility of their content. The corpus of content 14 therefore represents a large and distributed body of source documents 20 that, in general, each include source content 22 and a set of tags 24 that identify the subject matter addressed by the associated content and are stored in the same files or file structures as the associated content. The content 14 is a large and dynamically changing electronic document infrastructure, as source documents 20 are added to and removed from the infrastructure. In addition, the tags 24 are a large and dynamically changing set of subject matter identifiers for the source documents, with its own self-defining taxonomy, that develops over time as participants in the document infrastructure produce source content and strive to obtain search engine visibility for their content.

Accordingly, the corpus of tag-mediated content quality information 16 is designed to be a large and dynamically changing set of content quality information, organized and mediated by tags, indicating the quality of the source content 14. The content quality information is created by a tag-based document and community participant scoring engine 30, which maintains the tag-mediated content quality scores and implements the various computations. The content quality information 16 is obtained and continually updated by the scoring engine 30 through the monitoring of implicit user engagement and explicit sales metrics of community participants 40, along with any additional factors that that the system designers seem appropriate for content quality scoring. Therefore, the content quality information 16 evolves over time in response to changes in and user interaction with the source content 14. The content quality information 16 is typically stored in a database organized as a single or relational data structure (as shown on FIG. 3) separate from the source documents as a matter of programming and operational convenience, particularly with respect to response time. Nevertheless, it should be appreciated that the content quality information could be distributed or embedded in whole or in part within the source documents or maintained in any other suitable data structure as a matter of design choice.

As shown on FIG. 1, the TMRS 12 can be used for a variety of purposes, such as enhancing the operation of document retrieval systems 32 and e-commerce sales systems 34. For known document searching, the TMRS 12 can be used to enhance the operation of a document retrieval system by providing tag-mediated scores indicating the relative ranking of the retrieved document in its subject matter areas, as indicated by the tags associated with the document. This is illustrated in FIG. 4, in which an identifier 70 returned by a document retrieval system in response to a known document request is displayed along with associated tags 72 and tag-based scores 74. The tag-based scores for the document are typically ranked and displayed in a priority order. This same type of scoring system can be used to provide content quality information for products and services offered for sale through e-commerce sales systems 34. As another example, FIG. 5 illustrates search engine results in which a search engine request 76 return a identifiers 80 for a group of responsive documents that are ranked in a priority order using the tag-based content quality information. The search results may also include a document ranking 82 indicating the relative computed pertinence of the responsive documents to the search request. More specifically, initial search results are typically obtained by factoring a composite document score into the indexing process used by the search engine to prioritize the initial search results. Once a manageably sized set of responsive documents has been identified, they are re-ranked and displayed in priority order based on a tag-based analysis comparing the tag-based content quality scores for the documents to tag identified in the search request.

As shown best on FIG, 2, the content quality information typically includes tag-based scores and a composite content quality score, which is computed from the tag-based scores and any other information deemed relevant by the system designers. In particular, negative feedback factors based on complaints or positive factors, for example based on participant credentials or affiliate status, can also be taken into account in the document and participant scoring process. The community participants 40 include a wide range of users who are grouped into categories for scoring and ranking purposes. This allows the community participants 40 to be ranked along with the source documents 20. Therefore, the tag-mediated ranking process include source document ranking 42 as well as community participant ranking 44. The specific categories of community participants tracked, scored and ranked in the illustrated embodiment of the TMRS include content producers 50 who receive a content producer ranking 52, content users 54 who receive a content user ranking 56, content reviewers 58 who receive a reviewer ranking 60, and review moderators 62 who receive a moderator ranking 64.

FIG. 2 also illustrates an automated process for computing and updating the document rankings 42 and the community participant rankings 44 through content feedback 46 obtained by monitoring user interaction with the source documents 20. The particular monitored metrics for the illustrated version of the TMRS include implicit engagement metrics and explicit sales metrics. These metrics are tracked for user interaction with source content as well as reviews and moderator reports, which allows the reviews and moderator reports to be reflected in the document and community participant scoring process. The specific implicit engagement metrics monitored by the illustrative system include traffic metrics, page view metrics, audio/video metrics and external embedding metrics. Traffic metrics reflect the number of user visits (links) to a particular source document, page view metrics reflect the number of pages of the source document viewed during user visits, audio/video metrics reflect the amount of audio and video data received by users during user visits to the source document, and external embedding metrics reflect the amount of content from the source document that users have embedded into other web items. In addition, the specific items of content in source documents and be weighted differently so that user interaction with particular data items can be weighted more heavily in the document and participant scoring process. The explicit sales metrics reflect the sales and volume and commercial advertising value ascribed to particular documents and participants based on monitored on-line activity. The specific explicit sales metrics monitored by the illustrative system include purchases made by users after receiving information from the particular source document, repeat purchases made by users after having made an initial purchase after receiving information from the particular source document, links made by users to sites providing additional information regarding produces or services for sale after receiving information from the particular source document, and links made by users to affiliate commercial sites after receiving information from the particular source document. It should be appreciated other implicit metrics, explicit metrics, and heuristic factors can be factored into the content and community scoring process, as desired.

FIG. 2 further illustrates the use of community participant rankings 44 and content feedback 46 to compute content quality scored for source documents, which for each source document include tag-mediated content quality scores 45 and a composite content quality score 47. The same basic process is used to compute the community participant rankings 44, including the content producer rank 52, the user rank 56, the reviewer rank 60, and the moderator rank 64. The composite content quality score 47 for a particular document reflects a weighted average of the tag-mediated content quality scores 45 for the document and may take into account additional information that that system designers decide to factor into the document scoring process. The particular weights used in the computation of the composite content quality score are computed my a machine learning process configured to optimize the outcomes of user engagement and sales revenue. The relative importance of the desired outcomes (i.e., user engagement and sales revenue) can be weighted (e.g., 40%-60%), and other or additional desired outcomes can be considered, as desired.

In addition, each tag-mediated content quality score reflects a weighted average of the user rank for the document, the content producer rank for the document, the reviewer rank for the document, the moderator rank for the documents, and may take into account additional information that that system designers decide to factor into the document scoring process. The user rank for a particular source document reflects a weighted average of the implicit and explicit metrics for users who engaged with the particular document, where the weighting factors are the user ranks of the those users who engaged with the document. Similarly, the content producer rank for the particular document is the content producer rank associated with the author or sponsor of the particular document. The reviewer rank for the particular document reflects a weighted average of the reviews who submitted concerning the document, where the weighting factors are the reviewer ranks for those reviewers. Likewise, moderator rank for the particular document reflects a weighted average of the moderators who submitted moderator reports concerning reviews of the document, where the weighting factors are the moderator ranks for those moderators. The underlying participant rankings (i.e., user rank, content producer rank, reviewer rank, and moderator rank) are computed based by monitoring implicit engagement metrics and explicit sales metrics and normalizing across tag domains. This allows the tag-mediated content quality scores to be computed on a per-tag basis.

Referring to FIG. 3 and FIGS. 4-6, the TMRS 12 can be used to support the participants 40 in the electronic community 10 and enhance the services provided by the electronic document retrieval system 32 in a number of important ways. As shown in FIG. 4, the system provides an indicator of a responsive document 70 in response to a known document request that is enhanced by the also providing content quality information for the responsive document including tags 70 and tag scores 74 for the document. As shown in FIG. 5, in response to a search engine request 76, the system enhances the search engine functionality by providing initial sear results that are prioritized at least in part based on the composite content quality scores for the responsive documents. The initial search results can then be re-ranked based on highest relative tag correspondence to the tag domains identified in the search request, so that the search results 80 are displayed in a priority order based on a tag-based evaluation of relevance. The resulting relevance score 82 for the responsive documents can also be displayed along with the search results. As shown in FIG. 5, the system can also receive a query 84 for experts in particular subject matter are and respond with a ranked lists of experts 86 (i.e., community participants) based on their relative rankings in the tag domains identified in the search request. Again, the relative expert rankings 88 can be displayed along with the search results. That is, TMRS 12 can provide similar tag-based prioritized search results for all of the source documents and community participants (i.e., users, content providers, reviewers and moderators) represented in the system.

As also shown in FIG. 3, the TMRS 12 can also totalize, normalize and rank groups of content, community participants, or combinations. For example, the system can rank portal pages by tag-based quality ratings taking into account the content quality ratings for all content associated with portal pages. To give one example, all portal pages containing fantasy sports information can be ranked in a priority order based on tag-based quality ratings for all of the sports-related content associated with portal pages. Similarly, groups of community participants can be ranked based on their relative expertise in certain tag domains. This can be useful, for example, when evaluating affiliates, potential venture partners, and any other group represented by multiple community participants.

Figures 7, 8:
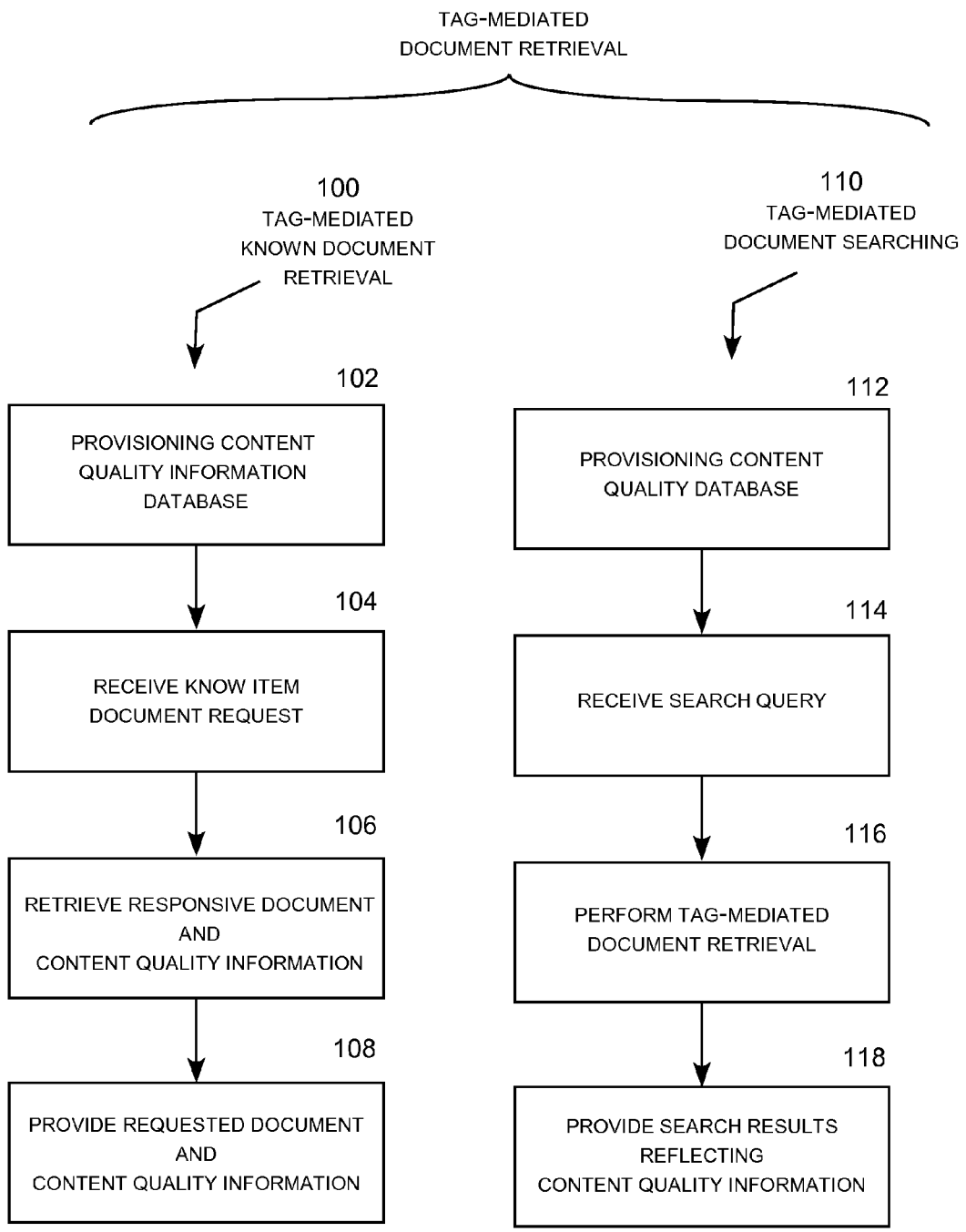
FIG. 7 is a logic flow diagram illustrating known document retrieval in the tag-mediated review system.
FIG. 8 is a logic flow diagram illustrating search engine document retrieval in the tag-mediated review system.

FIG. 7 is a logic flow diagram illustrating a routine 100 for known document retrieval in the TMRS 12. In step 102, the content quality information database (i.e., database 16 on FIG. 3) is provisioned. This is an ongoing process in which the database is initially provisioned and the continually updated as source documents and community participants are added and removed from the database over time. The provisioning routine 102 is shown in greater detail in FIG. 9, for which the function blocks are a further expanded in FIGS. 10-13. Step 102 is followed by step 104, in which the system receives a known document request. Step 104 is followed by step 106, in which the system retrieves the responsive document and content quality information (i.e., tag-based scores) for the responsive document from the content quality information database. Step 106 is followed by step 108, in which the system displays an indicator for the responsive document along with the content quality information for the responsive document. An illustrative result of the known document retrieval process is shown in FIG. 4.

FIG. 8 is a logic flow diagram illustrating a routing 110 for search engine document retrieval in the TMRS 12. In step 112, the content quality information database (i.e., database 16 on FIG. 3) is provisioned. This system preferably uses the same content quality information for known document retrieval, search engine document retrieval, and the other tag-based enhanced services including, by way of example, those illustrated in FIG. 3 described previously. Step 112 is followed by step 114, in which the system receives a search engine search query. Step 114 is followed by step 116, in which the system performs tag-mediated document retrieval, as described previously with reference to FIGS. 1-3. This includes retrieving initial search results in a priority order based at least in part on the content quality information (i.e., composite content quality scores for source documents used during the search engine indexing process) and re-ranking the search results based on content quality information (tag-based scores) and relative tag correspondence between the responsive documents and tags identified in or associated with the search request. Step 116 is followed by step 118, in which the system displays indicators for the responsive document in priority order based on tag-based ranking along with relevance ranks for the responsive document. An illustrative result of the search engine document retrieval process is shown in FIG. 5. It should be understood that FIGS. 7 and 8 detail two illustrative examples of support that the TMRS provides to the electronic community. Additional examples are shown on FIG. 3 (e.g., expertise ranking for community participants, portal page ranking) and additional functions using the principles of the invention can be provided, as desired.

Figure 9:
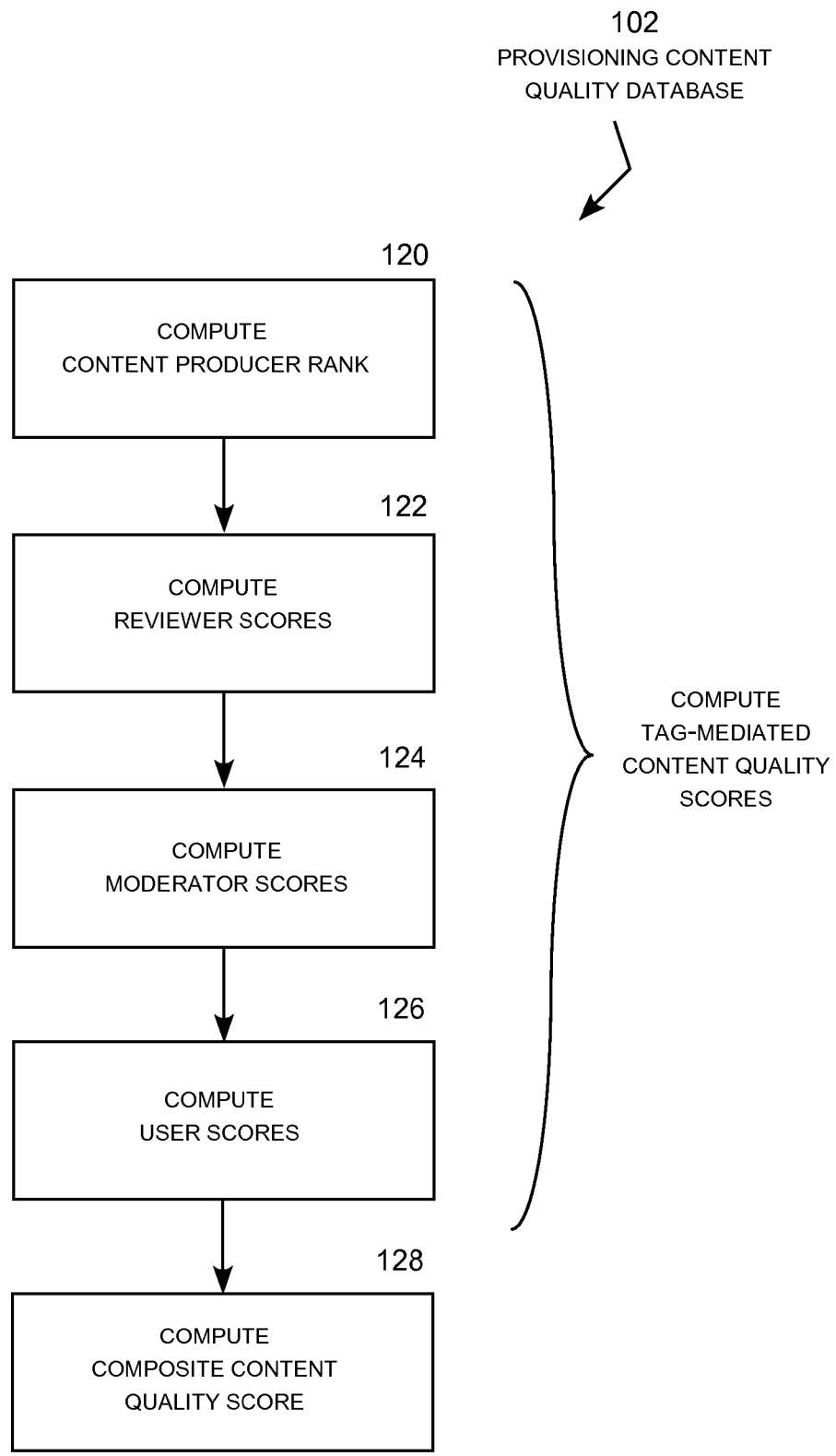
FIG. 9 is a logic flow diagram illustrating provisioning of a content quality database in the tag-mediated review system.

FIG. 9 is a logic flow diagram illustrating routine 102 on FIG. 7 (also corresponding to routine 112 on FIG. 8) for provisioning the content quality database 16 for use in the TMRS 12. In step 120, the system computes content producer scores, as shown in greater detail in FIG. 10. Step 120 is followed by step 122, in which the system computes reviewer scores, as shown in greater detail in FIG. 10. Step 122 is followed by step 124, in which the system computes moderator scores, as shown in greater detail in FIG. 11. Step 124 is followed by step 126, in which the system computes user scores, as shown in greater detail in FIG. 12. Step 126 is followed by step 128, in which the system computes user scores, as shown in greater detail in FIG. 13.

Figure 10:
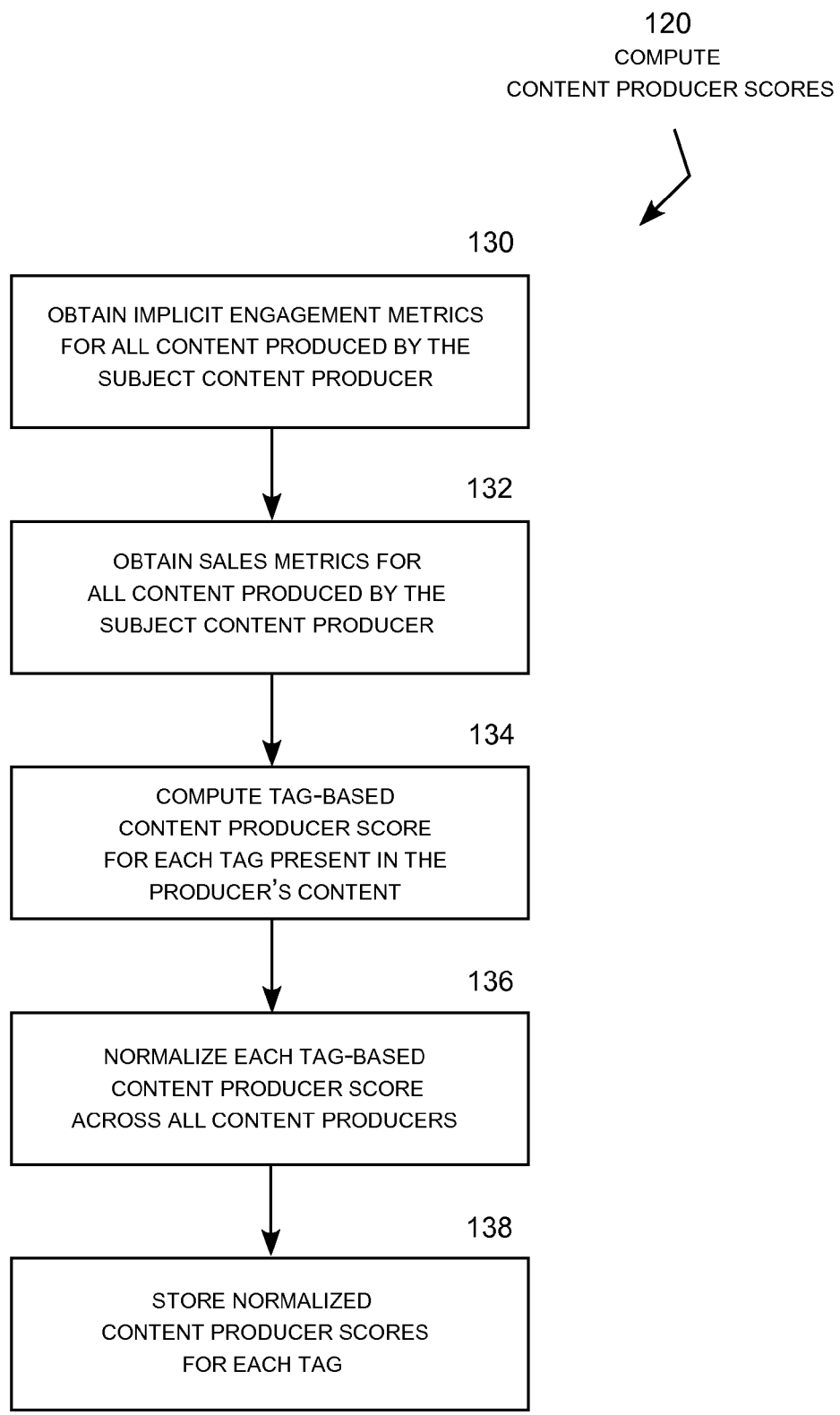
FIG. 10 is a logic flow diagram illustrating computation of content producer scores in the tag-mediated review system.

FIG. 10 is a logic flow diagram illustrating routine 120 (step 120 in FIG. 9) for computing content producer scores in the TMRS 12. In step 130, the system obtains implicit engagement metrics for all content produced by a particular content producer. Step 130 is followed by step 132, in which the system obtains explicit sales metrics for the content produced by the particular content producer. Step 132 is followed by step 134, in which the system computes a tag-based content producer score for each tag present in the producer's content based on the implicit engagement metrics and the explicit sales metrics. This process is repeated for each content producer represented in the system. Step 134 is followed by step 136, in which the system normalizes the tag-based content producer scores, on a tag domain basis, across all content producers. That is, the system computes tag-based content producer scores for all content producers for all tags present in the source content. This allows the system to normalize the content producer scores on a tag domain basis (i.e., express as a percentage based on relative content producer scores separately for each tag). Step 136 is followed by step 138, in which the system saves the tag-based content producer scores for the particular content producer. This process is repeated for all content producers represented in the system. Once the content producer scores have been computed for all content producers in a particular tag domain, they can be ranked and displayed in a priority order, either with or without the tag-based scores.

Figure 11:
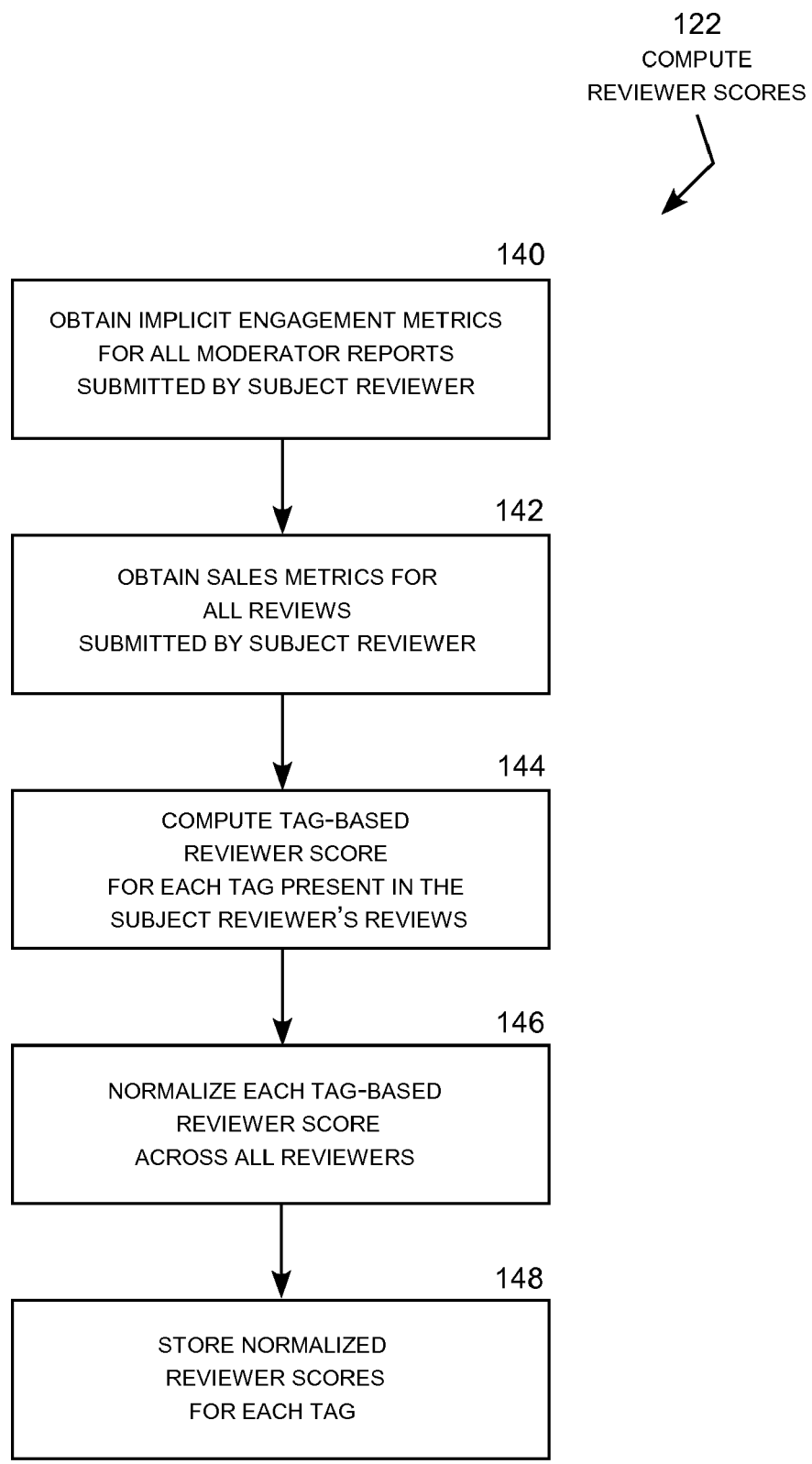
FIG. 11 is a logic flow diagram illustrating computation of reviewer scores in the tag-mediated review system.

FIG. 11 is a logic flow diagram illustrating routine 122 (step 122 in FIG. 9) for computing reviewer scores in the TMRS 12. In step 140, the system obtains implicit engagement metrics for all reviews submitted by a particular reviewer. Step 140 is followed by step 142, in which the system obtains explicit sales metrics for the reviews submitted by the particular reviewer. Step 142 is followed by step 144, in which the system computes a tag-based reviewer score for each tag present in the reviewer's reviews. This process is repeated for each reviewer represented in the system. Step 144 is followed by step 146, in which the system normalizes the tag-based reviewer scores, on a tag domain basis, across all reviewers. That is, the system computes tag-based reviewer scores for all reviewers for all tags present in the corpus of reviews in the system. This allows the system to normalize the reviewer scores on a tag domain basis (i.e., express as a percentage based on relative reviewer scores separately for each tag). Step 146 is followed by step 148, in which the system saves the tag-based content producer scores for the particular reviewer. This process is repeated for all reviewers represented in the system. Once the reviewer scores have been computed for all reviewers in a particular tag domain, they can be ranked and displayed in a priority order, either with or without the tag-based scores.

Figure 12:
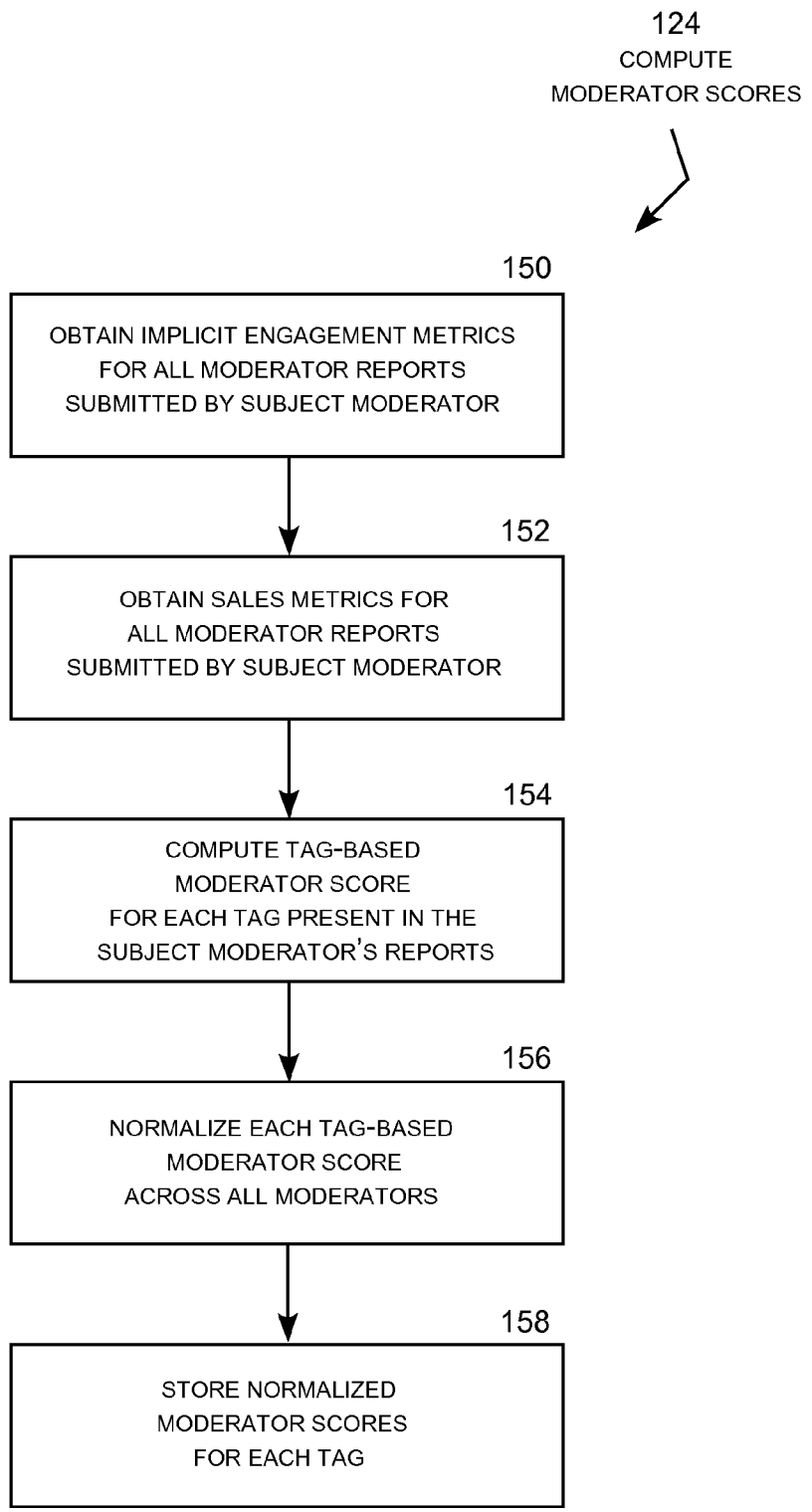
FIG. 12 is a logic flow diagram illustrating computation of moderator scores in the tag-mediated review system.

FIG. 12 is a logic flow diagram illustrating routine 124 (step 124 in FIG. 9) for computing moderator scores in the TMRS 12. In step 150, the system obtains implicit engagement metrics for all moderator reports submitted by a particular moderator. Step 150 is followed by step 152, in which the system obtains explicit sales metrics for the moderator reports submitted by the particular moderator. Step 152 is followed by step 154, in which the system computes a tag-based moderator score for each tag present in the moderator's reports. This process is repeated for each moderator represented in the system. Step 154 is followed by step 156, in which the system normalizes the tag-based moderator scores, on a tag domain basis, across all moderators. That is, the system computes tag-based moderator scores for all moderators for all tags present in the corpus of moderator reports in the system. This allows the system to normalize the moderator scores on a tag domain basis (i.e., express as a percentage based on relative moderator scores separately for each tag). Step 156 is followed by step 158, in which the system saves the tag-based moderator scores for the particular content producer. This process is repeated for all content producers represented in the system. Once the moderator scores have been computed for all moderators in a particular tag domain, they can be ranked and displayed in a priority order, either with or without the tag-based scores.

Figure 13:
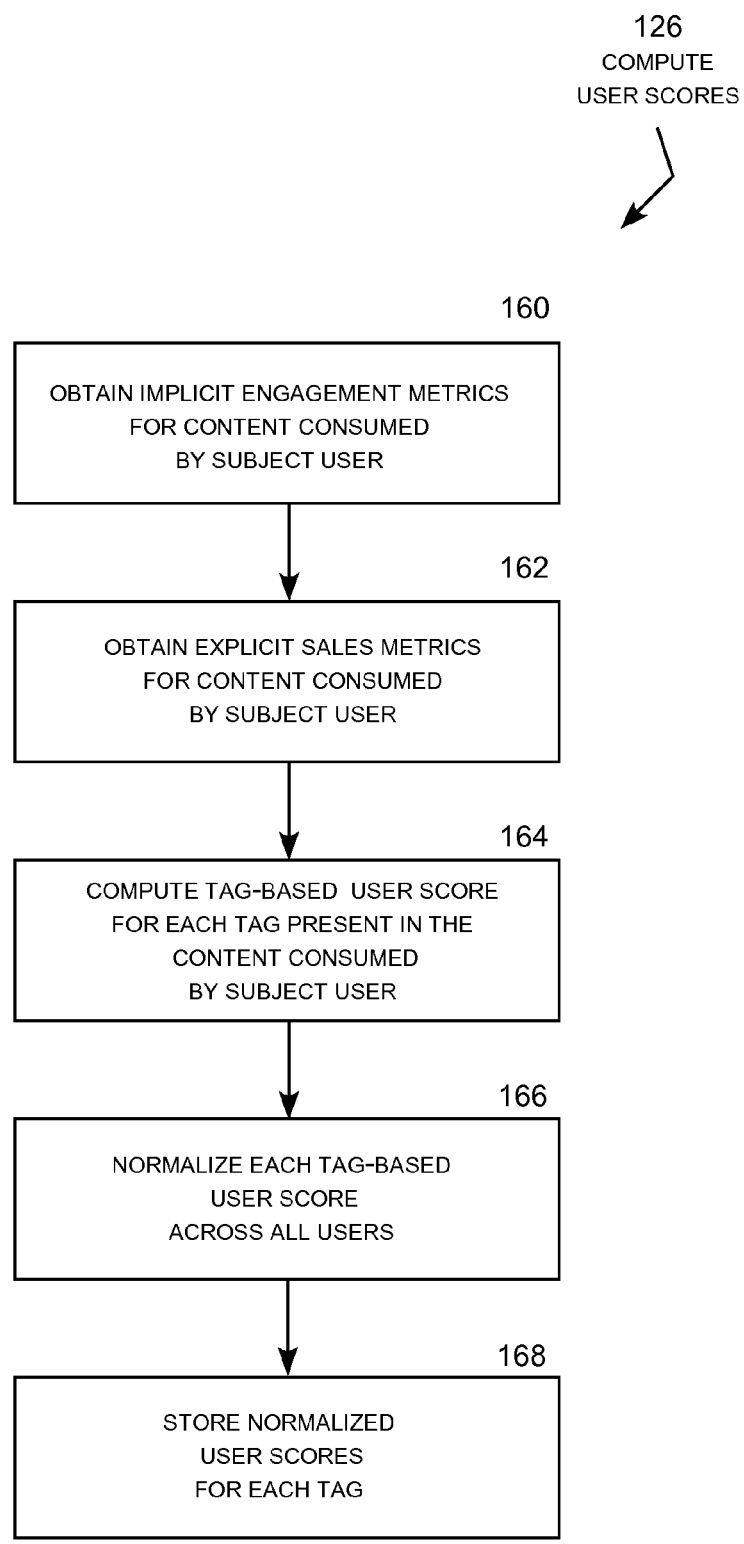
FIG. 13 is a logic flow diagram illustrating computation of user scores in the tag-mediated review system.

FIG. 13 is a logic flow diagram illustrating routine 126 (step 126 in FIG. 9) for computing moderator scores in the TMRS 12. In step 160, the system obtains implicit engagement metrics for all content consumed by a particular moderator. Step 160 is followed by step 162, in which the system obtains explicit sales metrics for the content consumed by the particular moderator. Step 162 is followed by step 164, in which the system computes a tag-based user score for each tag present in the content consumed by the particular user. This process is repeated for each user represented in the system. Step 164 is followed by step 166, in which the system normalizes the tag-based user scores, on a tag domain basis, across all users. That is, the system computes tag-based user scores for all users for all tags present in the corpus of source documents accessed by users in the system. This allows the system to normalize the user scores on a tag domain basis (i.e., express as a percentage based on relative user scores separately for each tag). Step 166 is followed by step 168, in which the system saves the tag-based user scores for the particular user. This process is repeated for all users represented in the system. Once the user scores have been computed for all users in a particular tag domain, they can be ranked and displayed in a priority order, either with or without the tag-based scores.

Illustrative Computations

A simplified illustrative set of computations are described below to further illustration the principles of one particular embodiment of the invention. In these computations, a number variables contribute to a content item's content quality score, including implicit engagement variables, explicit sales variables, content producer expertise, content reviewer expertise, moderator expertise, and review scores. All of these variables are factored on a by tag basis. Content items accumulate a base score independent of tag but they accumulate a greater proportion of their value from tag-mediated contributions of these values. Four measures of expertise are contained in the system: user, producer, reviewer, and review moderator. User expertise mediates the engagement, content producer expertise mediates the propagation of producer rank to the content, and a combination of moderator and review expertise determine the impact of the review factor.

The scoring process involves score variations and normalization. Attributes of content items may generate different distributions of ratings across the entire content. For instance, certain sets of content may introduce distortions that review scores and engagement metrics across content type (e.g. video, podcasts, or e-book), content length, content category, or other metadata, so each score is computed several times with different normalizations, once for each variant and these scores weighted to produce a final output. Within each variant, score distributions are fit to a custom distribution equalizing relative values across the metadata dimensions. Thus, the total score of item content quality is computed using a combination (or progressive updating, e.g. Bayesian) of three principal components: EngagementRank, ProducerScore, and ReviewRank, ModeratorRank (Equation 1):

$$\text{Total Score} = F(\text{EngagementRank}^v, \text{ProducerRank}^v, \text{ModeratorRank}^v, \text{ReviewRank}^v) \quad \text{(Equation 1)}$$

where each score component consists of up to v variants of the score computed by direct values as well as by the deviations from the expected distribution of the score with respect to a set of salient dimensions.

There are a number of considerations when creating a composite of the three scores to produce an overall quality score, but first an example of tag mediation will be provided and then each component considered. For each factor, every variable considered is weighted by the expertise (ExpertRank) of a system user in consuming the content (UserRank), reviewing the content (ExpertRank) producing moderator reports concerning the reviews (ModeratorRank), or producing content (ContentProducerRank) for the tags related to the content. The computation of ExpertRank in each tag for engagement, reviews, moderator reports, and producers will be detailed below, but is generally a composite of the user's engagement with content of that tag, the user's predictive ability in reviewing content with those tags and in auditing the quality of other reviews, and the quality of the content that the user produces with those tags. The example below illustrates the computation of a particular instance of ExpertRank for review quality (ReviewerRank), for the setting with 5 tags (T1 . . . T5) and not considering the interactions between ReviewerRank and ModeratorRank.

To illustrate the expert rank computation, consider an example with five possible content tags 1 through 5 (i.e., T1-T5) and a free slot. Looking at the simple case of reviews, and not considering moderator reports, this is how tag mediation works in its most simple statistical realization. The term "power" and not ExpertRank is used in this case as the actual computation of the review score component is a composite of the review scores and the ratings of those reviews. The reviewers get up to the allocated % of power for their Expert Rank in each tag. Regardless of expertise, they get 25% of the power to change the rating. This expertise independent factor is generally referred to as the "free" power variable throughout this document.

TABLE 1

Free Power Versus Tag Mediated Power

| Expert Category | % Power |
|---|---|
| T1 | 15% |
| T2 | 15% |
| T3 | 15% |
| T4 | 15% |
| T5 | 15% |
| Free | 25% |

This measure of power is used to weight the review scores applied by multiplying the review score by the total power and creating a weighted average that divides by the sum of the power of the reviewers. The following sheet represents this calculation in a simple form of weighted averaging.

TABLE 2

Tag Mediation Example Computation

| Reviewer Power Description Partial | Rating 1-10 | T1 | T2 | T3 | T4 | T5 | Free | Total Power | Points |
|---|---|---|---|---|---|---|---|---|---|
| Expert | 8 | 80% | 50% | 0% | 0% | 0% | 100% | 0.445 | 0.356 |
| Newbie | 2 | 0% | 0% | 0% | 0% | 0% | 100% | 0.25 | 0.05 |
| Novice | 6 | 50% | 40% | 30% | 20% | 0% | 100% | 0.46 | 0.276 |
| Expert | 9 | 80% | 50% | 60% | 70% | 60% | 100% | 0.73 | 0.657 |
| Newbie | 2 | 0% | 0% | 0% | 0% | 0% | 100% | 0.25 | 0.05 |

TABLE 2-continued

Tag Mediation Example Computation

| Reviewer Power | | Tag Based Expert Rank | | | | | | | |
|---|---|---|---|---|---|---|---|---|---|
| Description Partial | Rating 1-10 | T1 | T2 | T3 | T4 | T5 | Free | Total Power | Points |
| Newbie | 3 | 0% | 0% | 0% | 0% | 0% | 100% | 0.25 | 0.075 |
| Newbie | 4 | 0% | 0% | 0% | 0% | 0% | 100% | 0.25 | 0.1 |

This results in a weighted score which is higher than the simple average of the ratings, due to the higher ratings provided by the powerful reviewers (Table 3):

TABLE 3

Outcomes with and without Expertise Consideration

| Unweighted Average | 4.86 |
|---|---|
| Weighted Average | 5.94 |

The essence of this formulation is that increased ExpertRank in tags affords a greater ability to affect the final score. Other instances of ExpertRank (i.e., UserRank, ModeratorRank, and ContentProducerRank) are computed similarly, but over different sets of metrics and utility functions. For example, the UserRank is computed over the engagement metrics (described in the next section), and corresponds to how well the user engagement score correlates with the explicit review scores assigned to the content for each tag.

The engagement score is composed of a set of engagement metrics weighted by the UserRank computed for each tag as outlined above. The engagement metrics include:
  % of video watched
  % of video watched beyond X minutes
  Recommendation actions for the content (e.g. email this to a friend)
  % viewers reviewing
  # of reviews
  # of comments
  length of reviews
  % of users viewing other content from the provider days since last review
  # of reads of reviews
  # of external referrals
  # of external plays
  % of users who view the video beyond X minutes who also scroll the page to read the reviews and supporting text
  For paid content, % of users who scroll the page to consume the entire sales document
  Click through to other content from an author
Each engagement metric is factored through tag expertise prior to being merged by a weighted average or more complex calculation. For each engagement metric, a single user's ExpertRank in each of the tags consumed is considered. They get the "free" weight afforded all users but potentially additional power to influence the outcome given rank in the tags assigned by the producer to the content. Normalization of each engagement metric occurs through comparing a specific value to the distribution of values for that metric in the system.

The system also features several implicit engagement logging functions which are beyond conventional practice. The video player—server combination tracks views of the player UI and the level of play of the video. Additionally, content pages on the aggregator site track depth of scrolling.

The content producers accumulate rank or scoring credit due to the success of their content in engagement metrics, reviews, and content sales. The specific metrics considered include:
  per user total engagement scores
  total video conversions
  % of page views converting to content consumption
  total sales of commercial content
  % of users visiting more than one content item from the producer
  # of page views on author page
  # of testimonials
  ratio of free to paid content with U shaped distribution
In general, the composite engagement metrics per user per tag associated with each content item a producer makes freely available on the site is pooled to produce one contributor to the content producer rank. Additionally, total volume of activity and a specific subset of engagement metrics are considered along with sales of commercial content and the distribution of content across free and paid. Content producer user accounts also accumulate tag rank or scoring credit through reviews and engagement metrics with tagged content. This provides an additional input to the content rank function.

The example of review scores above omitted the influence of reviews of reviews, referred to as moderator reports. These moderator reports affect the power of the reviewers considered in moderator reports to influence the overall review score. Positive moderator reports increase the ExpertRank on a per tag basis, increasing the contribution of the review score in the weighted averaging across all reviews. A variety of anti-gaming mechanisms are also put in place for these mechanisms to function. Content producers may not review their own content and their moderator reports are not considered in the weighting. Additionally, affiliate revenue associated with a specific user may discount their reviews or moderator reports from consideration.

The three scores (engagement, producer, and review) are then combined in a function that is essentially a weighted averaging. The weight of each factor is subject to a base relative weighting, further refined by the total "power" of the score—a sum of the free and expert weights across all contributing users, reviews, and the strength of the producer expertise. This weighting dimensionality is reduced at an exponential scale in order to create the opportunity for new content to have a "honeymoon" where a small number of positive influences can raise its rank strongly.

The system also includes mechanisms for checking and balancing the computed ExpertRank values. A mechanism for empowering and discounting reviews according to their moderator reports has been described. In addition, the reviewers and moderators expert ranks in each tag are affected by the engagement metrics. Specifically, reviewers and moderators gain or lose ExpertRank scoring value in the specific tags according to the degree to which they predict the overall engagement score. Scores are recomputed frequently but not in real time. In addition, edits of tags associated to content are only propagated periodically as well to reduce gaming.

At some point in time, the raw historical data is archived and a score and strength of the score stored for Bayesian probabilistic integration with new scores. The following section describes the best method yet determined for computing the review rank from a core set of metrics. The tag filter is as previously described, allotting 25% of possible weighting in scores to un-mediated tag data. The remaining 75% of weighting is allocated across the core 5 tags of a content item. The final quality score for a content item is a function of engagement metrics, review metrics, and content producer metrics. A standard learning mechanism is used to tune the component weights to predict engagement and sales of commercial content.

The engagement of all users with the content is not equal— some users are more savvy than others in consuming particular types of content. Hence, the combined value $\hat{E}^k$ of each engagement metric $E^k$ for a content item (e.g., % of the video watched) is computed as a weighted average of the values of $E^k$ for all users interacting with the item. The weight of each user on the final average (e.g., the combined % of the video watched) is taken from the U×T matrix UE, where each entry $UE_{it}$ corresponds to the UserRank of user i for tag t. In other words, the value of each user i engagement metric is adjusted by the user's expertise in consuming content on the topic as reflected by the tag t, as embodied below:

$$\hat{E}^k = \frac{\sum_{t=0}^{T} \sum_{i=0}^{U} E_i^k \cdot UE_{it}}{U} \quad \text{(Equation 2)}$$

where the numerator is a weighted average of engagement metric values over all users U who have interacted with the content item, and the denominator the total number of users interacting with the content. A more accurate estimator when sufficient data is available is Bayesian updating which discounts additional evidence (e.g., additional user engagement values) after some minimum number of engagements m have occurred.

The averaged engagement metric values are then combined into a single EngagementScore with a custom set of weights assigned to each metric. For the illustrative implementation, the following metrics and weights suffice:

Page views with video play/page views, weight: 25%
Unique Users Visiting Content Author Homepage/Unique Users Visiting Content, weight: 25%
Total users visiting content page, 25%
Percent of users consuming more than X minutes of the video. 2 minutes is a good value of X for a wide range of video lengths beyond 10 minutes.

For each metric, the distribution of scores is fit to a half Gaussian distribution from 0 to 1. User accumulate expert rank for this computation by positive contribution to these metrics. For these metrics, a slight permutation is required to accumulate rank to users. Each video play accumulates a point in the tags of the video, each visit to an authors homepage accumulates a point in the source video, and each content page view accumulates a point. An additional point is accumulated if more than 2 minutes of the content is consumed. An important scenario is a very well marketed video that produces low engagement. This content will score well on total users but poorly on depth of consumption and plays over page views.

Each review score is adjusted by a review weight, or quality, estimated using a combination of the moderator scores. For the purposes of this calculation, we assume that we have available an M×T matrix of moderator expertise scores, ME, where each entry $ME_{it}$ corresponds to the expertise of a moderator i for items tagged with tag t. Specifically, each moderator report $mr_i$ is adjusted by the moderator's expertise on the topic as reflected by the tag, as embodied below:

$$w_r = \frac{\sum_{t=0}^{T} \sum_{i=0}^{M} mr_i \cdot ME_{it}}{\sum_{t=0}^{T} \sum_{i=0}^{M} ME_{it}} \quad \text{(Equation 3)}$$

Where the numerator is a weighted average of moderator scores assigned to the review, and the denominator normalization is the highest possible moderator score that could be achieved if all moderator scores ranged from 1 to 1. Note that this is just one possible implementation of $w_r$. A more accurate estimator when sufficient data is available is Bayesian updating which discounts additional evidence (e.g., additional moderator scores) after some minimum scores m have been seen.

The system also employs a High-level Bayes net for dependencies between groups of variables. In the overall Bayes model for updating the quality score of item, the framework inference is computationally feasible as influence, of say, ModRank or ExpertRank is confined to the influence on the overall ReviewScore only, which in turn is just one of the variables ultimately influencing a user to view or purchase the content. Note that each node in the net is actually a composite of multiple features or metrics. For feasibility, with treat each set of metrics (e.g., User Engagement) as atomic node for interacting with other nodes in the net. Note, that other interactions between nodes are possible (e.g., allowing the Content Producer Rank to directly influence the User Engagement metrics.

The model parameters are recursively optimized using back propagation (common implementations include Neural Nets with Gradient Descent or Logistic Regression) to best fit the observed data. For example, given observed values for User Engagement and Content Purchase history, the Review Score values are adjusted to correlate with the outcomes. That in turn forces parameter updates to all nodes connected to ReviewScore, namely User Quality, ExpertRank and ModeratorRank.

The content producer rank is normalized across all content producers to a half Gaussian based upon: the percent of possible engagement overall score, stack ranked and normalized across content producers—25%; page views for the author home page, stack ranked and normalized across content producers—25%; sum of unit sales, stack ranked and normalized across content producers—25%; custom function on the ratio of free to paid content incentivizing a 3 to 1 split and disincentivizing all free or all paid—25%. The final score is a weighted average of the Engagement, Review, and Content producer scores with initial weights of 2, 2, and 1 respectively. The scores per content item are archived monthly with a weight score. Weighted averaging is used to factor in historical data in an inverse power function of 1/(# of months old).

In an ecosystem as dynamic as the one specified here with strong monetary incentives due to the sale of a subset of content, strong defenses against manipulation are required.

Spidering of external embedding of content in web pages should reveal text that is not similar to the tags and expose mis-tagging. While the positive feedback loops from successful content to publisher and from quantity of reviews to its placement in search ordering are desirable, improperly balanced they could lead to a rich get richer and poor get poorer scenario. Normalizations and damping factors, like scaling Expert Ranks in tags by the number and nature of experts in this tag, are designed to insure that the system is appropriately dynamic.

Spread expert rank among related tags identified by co-occurrence and clustering methods in order to increase the depth of the system's understanding of expertise. Incentivizing reviews and review ratings is also helpful. What is the motivation and how could it be enhanced? For content producers, the accumulation of ExpertRank has direct effects on their own content's visibility. For users, reviewing activities provide some personal attention economy gains much like weblogging. Enforcing good tag specification, and not tag spam, is built into the negative feedback loop for engagement metrics that decrease the value of content that is shown to users but not engaged. Create dynamicism that provides a strong initial boost to new content with a probability of quality, exposing it to engagement metrics and reviews to rapidly assess its quality. Connotative equivalents of tags can be constructed by editorial efforts. Producer rank may need a per time quality score if the number of items per producer becomes large.

Good content producers should receive a boost to review and moderator rank, at least if data is unavailable about the quality of their reviews and moderator reports. A click on a search result for a search may or may not be a vote of confidence. The duration of visit from a click, or at least a split of short and long durations, can be used to infer a gain in rank proportional to the position of the result clicked. This is meant to reward the extra effort required to work through the search results.

It should be understood that the foregoing relates only to the exemplary embodiments of the present invention, and that numerous changes may be made therein without departing from the spirit and scope of the invention as defined by the following claims.

The invention claimed is:

1. A computer-readable medium storing computer-executable instructions executed by a processor for causing a computer-controlled apparatus to implement a tag-mediated review system for electronic content, the executed computer-executable instructions performing a method comprising the steps of:

obtaining on-line access to an infrastructure of a plurality of electronic source documents, wherein each electronic source document comprises source content supplied by an associated content producer and a plurality of content tags identifying subject matter contained within the source content;

receiving a plurality of reviews concerning the accessed plurality of electronic source documents, each review expressing quality assessment information for a corresponding electronic source document by an associated reviewer and one or more review tags identifying subject matter addressed by the review;

computing a tag-mediated content quality score for each electronic source document based at least in part on the plurality of received reviews, wherein the computed tag-mediated content quality score is based on tag scores for one or more of the corresponding content tags and one or more of the corresponding review tags;

compiling a content quality information database storing the tag-mediated content quality scores in association with corresponding content tags, review tags and identifiers of the plurality of electronic source documents;

receiving a document retrieval request;

retrieving information identifying one or more electronic source documents responsive to the received document retrieval request and the tag-mediated content quality scores associated with the responsive one or more electronic source documents; and displaying information identifying the responsive electronic source documents and the associated tag-mediated content quality scores or ranking the responsive electronic source documents in a priority order based directly or indirectly on the associated tag-mediated content quality scores and displaying indicators for the responsive electronic documents in the priority order.

2. The computer-readable medium of claim 1, wherein the document retrieval request is a known document request identifying a particular responsive electronic source document, further comprising the step of displaying an identifier of the particular responsive electronic source document in association with content tags and review tags associated with the particular responsive electronic source document and the corresponding tag-mediated content quality tag score for the particular responsive source document.

3. The computer-readable medium of claim 1, wherein the document retrieval request is a document search request submitted to a search engine, further comprising the steps of:

retrieving initial search results from the search engine ranked at least in part based on the tag-mediated content quality scores in the content quality information database;

comparing terms in the document search request to tags stored in the content quality information database;

identifying one or more relevant tags associated with the search request;

re-ranking the initial search results based on highest relative tag scores for the tags associated with the document search request in a re-ranked priority order; and displaying the re-ranked search results comprising identifiers of electronic source documents among the search results in the re-ranked priority order.

4. The computer-readable medium of claim 3, further comprising the step of displaying as part of the re-ranked search results an identifier of a particular source document, one or more tags associated with the search request, and the tag scores for the particular source document corresponding to the tags associated with the document search request.

5. The computer-readable medium of claim 1, further comprising the steps of:

receiving a plurality of reviews concerning a plurality of electronic source documents associated with a particular content producer;

computing a tag-mediated content producer rank for the particular content producer based on the reviews concerning the plurality of electronic source documents associated with the particular content producer that includes tag scores for one or more tags in the electronic source documents;

storing the tag-mediated content producer rank in the content quality information database in association with an identifier of the associated content producer; and wherein the computation of the tag-mediated content quality score for each source document associated with the particular content producer is based at least in part on the content producer rank for the particular content producer.

6. The computer-readable medium of claim 5, wherein the step of computing the tag-mediated content producer rank for the particular content producer further comprises the steps of:
  obtaining implicit engagement metrics indicative of user interaction with the electronic source documents associated with all content producers represented in the content quality information database;
  obtaining implicit engagement metrics indicative of user interaction with electronic source documents associated with the particular content producer; and
  normalizing the content producer rank for the particular content producer based on the implicit engagement metrics for the particular content producer and the implicit engagement metrics for all content producers represented in the content quality information database.

7. The computer-readable medium of claim 5, wherein the step of computing the tag-mediated content producer rank for the particular content producer further comprises the steps of:
  obtaining explicit sales metrics indicative of sales activity resulting from user interaction with the electronic source documents associated with the all content producers represented in the content quality information database;
  obtaining explicit sales metrics indicative of sales activity resulting from user interaction with the electronic source documents associated with the particular content producer; and
  normalizing the content producer rank for the particular content producer based on the explicit sales metrics for the particular content producer and the implicit engagement metrics for all content producers represented in the content quality information database.

8. The computer-readable medium of claim 5, wherein the step of computing the tag-mediated content producer rank for the particular content producer further comprises the steps of:
  obtaining implicit engagement metrics indicative of user interaction with the electronic source documents associated with the all content producers represented in the content quality information database;
  obtaining implicit engagement metrics indicative of user interaction with source documents associated with the particular content producer;
  obtaining explicit sales metrics indicative of sales activity resulting from user interaction with the electronic source documents associated with the all content producers represented in the content quality information database;
  obtaining explicit sales metrics indicative of sales activity resulting from user interaction with the source documents associated with the particular content producer; and
  normalizing the content producer rank for the particular content producer based on:
    the implicit engagement metrics for the particular content producer and the implicit engagement metrics for all content producers represented in the content quality information database, and
    the explicit sales metrics for the particular content producer and the implicit engagement metrics for all content producers represented in the content quality information database.

9. The computer-readable medium of claim 1, further comprising the steps of:
  receiving a plurality of moderator reports concerning the reviews, each moderator report expressing quality assessment information for a review by an associated moderator and one or more tags identifying subject matter addressed by the moderator report;
  computing a tag-mediated reviewer rank for each reviewer based on the moderator reports, wherein each tag-mediated reviewer rank includes tag scores for one or more tags in the associated reviews;
  storing the tag-mediated reviewer ranks in the content quality information database in association with the associated tags and identifiers of the associated reviewers;
  wherein the computation of the a tag-mediated content quality score for each electronic source document is based at least in part on the reviewer ranks of one or more reviewers who have submitted reviews concerning the electronic source document.

10. The computer-readable medium of claim 9, wherein the step of computing the tag-mediated reviewer rank for a particular reviewer comprises the steps of:
  obtaining implicit engagement metrics indicative of user interaction with the reviews submitted by all reviewers represented in the content quality information database;
  obtaining implicit engagement metrics indicative of user interaction with the reviews submitted by the particular reviewer; and
  normalizing the reviewer rank for the particular reviewer based on the implicit engagement metrics for the particular reviewer and the implicit engagement metrics for all reviewers represented in the content quality information database.

11. The computer-readable medium of claim 10, further comprising the steps of:
  receiving a plurality of moderator reviews concerning the moderator reports, each moderator review expressing quality assessment information for a moderator report and one or more tags identifying subject matter addressed by the moderator review;
  computing a tag-mediated moderator rank for each moderator based on the moderator reviews, wherein each tag-mediated moderator rank includes tag scores for one or more tags in the associated moderator reports;
  storing the tag-mediated moderator ranks in the content quality information database in association with the associated tags and identifiers of the associated moderators;
  wherein the computation of the a tag-mediated content quality score for each electronic source document is based at least in part on the moderator ranks of one or more moderators who have submitted moderator reports concerning one or more reviews concerning the electronic source document.

12. The computer-readable medium of claim 11, wherein the step of computing the tag-mediated moderator rank for a particular moderator comprises the steps of:
  obtaining implicit engagement metrics indicative of user interaction with the moderator reports submitted by all moderators represented in the content quality information database;
  obtaining implicit engagement metrics indicative of user interaction with the moderator reports submitted by the particular moderator; and
  normalizing the moderator rank for the particular moderator based on the implicit engagement metrics for the particular moderator and the implicit engagement metrics for all moderator represented in the content quality information database.

13. The computer-readable medium of claim 1, further comprising the steps of:

monitoring implicit engagement metrics indicative of user interaction with the electronic source documents;

computing a user rank for each electronic source document based at least in part on the implicit metrics indicative of user interaction with the electronic source document; and wherein the computation of the a tag-mediated content quality score for each electronic source document is based at least in part on the user rank for the electronic source document.

14. The computer-readable medium of claim 13, wherein the implicit engagement metrics indicative of user interaction for a particular electronic source document comprise one or more of the following:

traffic metrics indicative of hypertext links indicating online user visits to the particular electronic source document;

page view metrics indicative of the number pages viewed during the user visits to the particular electronic source document;

audio/video metrics indicative of the amount of audio/video content received by users during the user visits to the particular electronic source document; and external embedding metrics indicative of the amount of content from the electronic source document that users embedded into external electronic sites.

15. The computer-readable medium of claim 1, further comprising the steps of:

monitoring explicit sales metrics indicative of sales activity generated by user interaction with the electronic source documents;

computing a user rank for each electronic source document based at least in part on the explicit metrics indicative of indicative of sales activity;

wherein the computation of the a tag-mediated content quality score for each electronic source document is based at least in part on the user rank for the source document.

16. The computer-readable medium of claim 15, wherein the explicit sales metrics indicative of sales activity for a particular electronic source document comprise one or more of the following:

purchases made by users after receiving information from the particular electronic source document;

repeat purchases made by users after having made an initial purchase after receiving information from the particular electronic source document;

links made by users to sites providing additional information regarding produces or services for sale after receiving information from the particular electronic source document; and links made by users to affiliate commercial sites after receiving information from the particular electronic source document.

17. A computer-readable medium storing computer-executable instructions executed by a processor for causing a computer-controlled apparatus to implement a tag-mediated review system for electronic content, the executed computer-executable instructions performing a method comprising the steps of:

obtaining on-line access to an infrastructure of a plurality of of source documents, wherein each source document comprises source content supplied by an associated content producer and a plurality of content tags identifying subject matter contained within the source content;

monitoring implicit engagement metrics indicative of user interaction with the plurality of source documents;

computing a user rank for each source document based at least in part on the monitored implicit engagement metrics indicative of user interaction with the source document; and computing a tag-mediated content quality score for each source document based at least in part on the computed user rank and tag scores for one or more of the content tags corresponding to the source document;

compiling a content quality information database storing the tag-mediated content quality scores in association with corresponding content tags, user ranks, and identifiers of the plurality of source documents;

receiving a document retrieval request;

retrieving information identifying one or more source documents responsive to the received document retrieval request and the tag-mediated content quality score associated with the responsive one or more source documents; and displaying information identifying the responsive source documents and the associated tag-mediated content quality scores.

18. The computer-readable medium of claim 17, wherein the implicit engagement metrics indicative of user interaction for a particular source document comprise one or more of the following:

traffic metrics indicative of hypertext links indicating online user visits to the particular source document;

page view metrics indicative of the number pages viewed during the user visits to the particular source document;

audio/video metrics indicative of the amount of audio/video content received during the user visits to the particular source document; and external embedding metrics indicative of the amount of content from the source document that users embedded into external electronic sites during user visits to the particular source document.

19. A computer-readable medium storing computer-executable instructions executed by a processor for causing a computer-controlled apparatus to implement a tag-mediated review system for electronic content, the executed computer-executable instructions performing a method comprising the steps of:

obtaining on-line access to an infrastructure of a plurality of source documents, wherein each source document comprises source content supplied by an associated content producer and a plurality of content tags identifying subject matter contained within the source content;

monitoring explicit sales metrics indicative of sales activity generated by user interaction with the plurality of source documents;

computing a user rank for each source document based at least in part on the monitored explicit sales metrics indicative of user interaction with the source document; and computing a tag-mediated content quality score for each source document based at least in part on the computed user rank and tag scores for one or more of the content tags corresponding to the source document;

compiling a content quality information database storing the tag-mediated content quality scores in association with corresponding content tags, user ranks, and identifiers of the plurality of source documents;

receiving a document retrieval request;

retrieving information identifying one or more source documents responsive to the received document retrieval request and the tag-mediated content quality score associated with the responsive one or more source documents; and displaying information identifying the responsive source documents and the associated tag-mediated content quality scores.

20. The computer-readable medium of claim 19, wherein the explicit sales metrics indicative of sales activity for a particular source document comprise one or more of the following:

purchases made by users after receiving information from the particular source document;

repeat purchases made by users after having made an initial purchase after receiving information from the particular source document;

links made by users to sites providing additional information regarding produces or services for sale after receiving information from the particular source document; and links made by users to affiliate commercial sites after receiving information from the particular source document.

* * * * *